US007396688B2

(12) United States Patent
Estell et al.

(10) Patent No.: US 7,396,688 B2
(45) Date of Patent: Jul. 8, 2008

(54) MASS SPECTROMETRIC ANALYSIS OF BIOPOLYMERS

(75) Inventors: David A. Estell, San Mateo, CA (US); Grant C. Ganshaw, Tracy, CA (US); Christian Paech, Daly City, CA (US); Sigrid Paech, Daly City, CA (US)

(73) Assignee: Genencor International, Inc., Palo Alto, CA (US)

( * ) Notice: Subject to any disclaimer, the term of this patent is extended or adjusted under 35 U.S.C. 154(b) by 106 days.

(21) Appl. No.: 11/011,666

(22) Filed: Dec. 14, 2004

(65) Prior Publication Data

US 2005/0244848 A1 Nov. 3, 2005

Related U.S. Application Data

(63) Continuation of application No. 09/932,369, filed on Aug. 17, 2001, now abandoned.

(60) Provisional application No. 60/228,198, filed on Aug. 25, 2000.

(51) Int. Cl.
*G01N 24/00* (2006.01)

(52) U.S. Cl. .......................... 436/173; 435/6; 435/7.92; 436/175; 210/656

(58) Field of Classification Search ..................... 435/6, 435/967, 973, 7.92–7.94; 436/173–175, 436/177, 63; 73/61.52; 210/656
See application file for complete search history.

(56) References Cited

U.S. PATENT DOCUMENTS

| | | | | |
|---|---|---|---|---|
| 5,639,726 A | 6/1997 | Lawrence et al. | | |
| 6,391,649 B1 * | 5/2002 | Chait et al. | ................. | 436/173 |
| 6,974,704 B2 * | 12/2005 | Nelson et al. | ............... | 436/173 |
| 2002/0076739 A1 * | 6/2002 | Aebersold et al. | .......... | 435/7.92 |

FOREIGN PATENT DOCUMENTS

| | | |
|---|---|---|
| WO | WO 97 37953 A | 10/1997 |
| WO | WO 00 20357 A | 4/2000 |

OTHER PUBLICATIONS

Dalluge et al., Quantitative measurement of dihydrouridine in RNA using isotope dilution liquid chromatography-mass spectrometry (LC/MS), Nuclic Acids Research, 1996, vol. 24, No. 16, pp. 3242-3245.*

Gygi et al., Quantitative analysis of complex protein mixtures using isotope-coded affinity tags, Nature Biotechnology vol. 17, Oct. 1999, pp. 994-999.*

International Search Report for PCT/US01/25884 mailed Oct. 21, 2002.

International Preliminary Examination Report for PCT/US01/25884 mailed Aug. 29, 2003.

EP Communication, EPO Form 2001 for EP Application No. 01 964 178.6-2402 mailed Dec. 9, 2005.

Abstract, p. 449, right-hand column. (Listed—copy not provided).

Chen et al., "Isotope Edited Product Ion Assignment by Alpha-N Labeling of Peptides with [$^{2}H_{3}$(50%)]2,4-Dinitrofluorobenzene," *Journal of the American Society for Mass Spectrometry*, Elsevier Science Inc., New York, NY, vol. 10, No. 5, pp. 448-452 (1999).

Oda et al., "Accurate Quantitation of Protein Expression and Site-Specific Phosphorylation," *Proc. Natl. Acad. Sci. USA*, vol. 96, pp. 6591-6596 (1999).

Allen, G., "Seqencing of Proteins and Peptides," 2nd ed. Elsevier, Amsterdam (1989).

Altschul et al., "Basic Local Alignment Search Tool," *J. Mol. Biol.*, 215: 403-410. (1990).

Bairoch el et al., "The SWISS-PROT protein sequence database and its supplement TrEMBL in 2000," *Nucl. Acids Res.*, 28:45-48 (2000).

Burks et al., "GeneBank: Current Status and Future Directions," *Methods in Enzymology*, 183: 3-22 (1990).

Corthals et al., "Identification of Proteins by Mass Spectrometry," ed. Rabilloud, T. Springer, New York, pp. 197-231 (1999).

Christianson et al., "Peptide Mapping of Subtillisins as a Practical tool for Locating Protein Sequence Errors during Extensive Protein Engineering Projects," *Anal. Bloch*. 223:119-129 (1994).

Chowdhury et al., "Examination of Recombinant Truncated Mature Human Fibroblast Collagenase by Mass Spectrometry: Identification of Difference with the Published Sequence and Determination of Stable Isotope Incorporation," Rapid Commun. in Mass Spectom., 9: 563-569 (1995).

Deutscher MP ed., "Guide to Protein Purification," Academic Press, New York (1990).

George et al., "PIR-International Protein Sequence Database", *Methods in Enzymology*, 266:41-59 (1996).

Goddette et al., "The Crystal Structure of the *Bacillus lentus* Alkaline Protease, Subtilisin BL, at 1 .4 A Resolution", *J. Mol. Biol.*, 228:580-595 (1992).

Goeddel et al., "Synthesis of Human Fibroblast Interferon by *E. coli*.," *Nucl. Acids Res.*, 8:4057-4074 (1980).

Guermant et al., "Under Proper Control, Oxidation of Proteins with Known Chemical Structure Provides an Accurate and Absolute Method for the Determination of Their Molar Concentration", *Anal. Biochem.*, 277:46-57 (2000).

(Continued)

*Primary Examiner*—Long V. Le
*Assistant Examiner*—Gary W Counts
(74) *Attorney, Agent, or Firm*—Danisco A/S, Genencor Division

(57) ABSTRACT

The present invention makes use of unique tags of a specific biopolymer that can be exploited for determining the concentration the biopolymer in crude solutions. In preferred embodiments the biopolymer is either a protein or a polynucleotide. Particularly, the invention provides a method for the determination and quantitation of biomolecules in crude mixtures by way of a separation technique in combination with mass spectroscopy. In one general embodiment, a target biomolecule is selected for analysis and an analog thereof is generated. Peak area integration of the peptide pairs provides a direct measure for the amount of target protein in the crude solution.

16 Claims, 6 Drawing Sheets

OTHER PUBLICATIONS

Gygi et al., "Quantitative analysis of complex protein mixtures using isotope-coded affinity tags," *Nature Biotech*. 17:994-999 (1999).

Hale & Marham, The Harper Collins Dictionary of Biology, Harper Perennial, NY (1991).

Hancock WS, ed. "New Methods in Peptide Mapping for the Characterization of Proteins", CRC Press, Boca Raton (1996).

Hsia et al., "Active-Site Titration of Serine Proteases Using a Fluoride Ion Selective Electrode and Sulfonyl Fluoride Inhibitors," *Analytical Biochem*., 242:221-227 (1996).

Janson et al., "Protein Purification," 2nd ed., Wiley-Liss, New York (1998).

Kahn et al., "EMBL Data Library", *Methods in Enzymology*, 183:23-31 (1990).

Kellner et al., "Microcharacterization of Proteins", 2nd ed., Wiley-VCH, Weinheim (1999).

Karlin et al., "Application and Statistics for Multiple High-Scoring Segments in Molecular Sequence," *Proc. Natl. Acad. Sci. USA*, 90:5873-5877 (1993).

Karlin et al., "Methods for assessing the statistical significance of molecular sequence features by using general scoring schemes," *Proc. Natl. Acad. Sci. USA*, 87:2264-2268 (1990).

Kunst, et al., "The complete genome sequence of the Gram-positive bacterium *Bacilus subtilis*,"*Nature*, 390:249-256 (1997).

Lahm, et al., "Mass spectrometry: A tool for the identification of proteins separated by gels," *Electrophoresis*, 21:2105-2114 (2000).

Matsudaira, P., ed. "A Practical Guide to Protein and Peptide Purification for Microsequencing," 2nd ed., Academic Press, San Diego (1993).

Pace, et al., "How to measure and predict the molar absorption coefficient of a protein," *Protein Science* 4:2411-2423 (1995).

Scopes R., "Protein Purification," 3rd ed. Springer-Verlag, New York (1994).

Singleton et al., Dictionary of Microbiology and Molecular Biology, 2D ED., John Wiley and Sons, New York (1994).

Stocklin, et al., "A Stale Isotope Dilution Assay for the In Vivo Determination of Insulin Levels in Humans by Mass Spectrometry," *Diabetes*, 46:44-50 (1997).

* cited by examiner

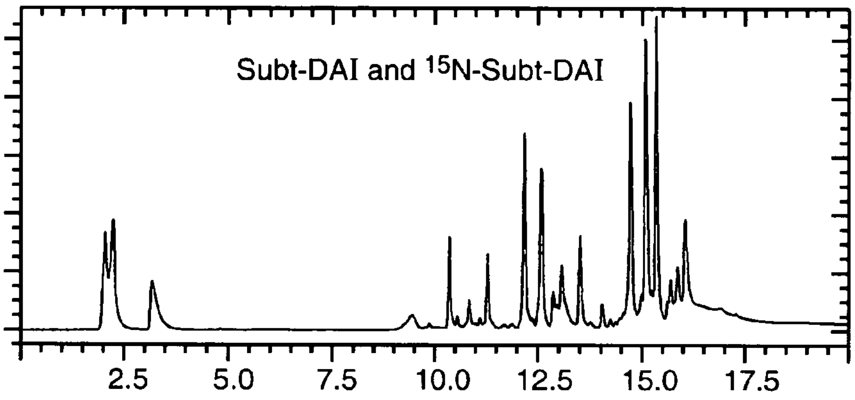
FIG._3
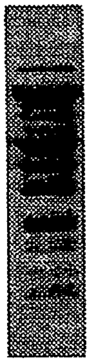
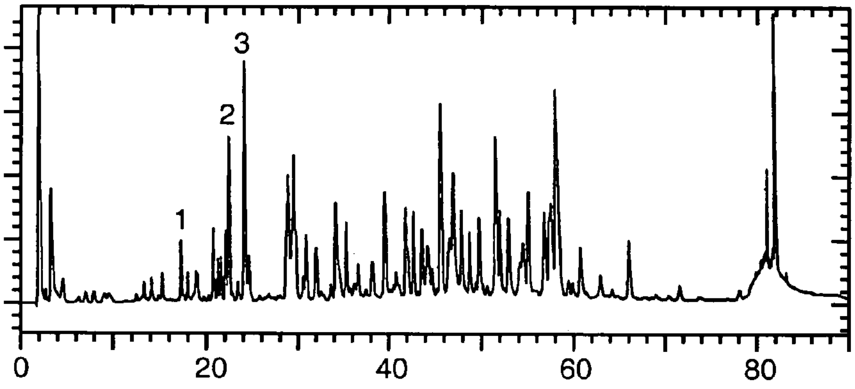
FIG._4A
FIG._4B

| Pep # | Sequence | m/z (wt) | m/z ($^{15}N$) | TIC Peak Area Ratio | UV Peak Area Ratio |
|---|---|---|---|---|---|
| 1 | AQSVPWGISR | 1100.58(1+) | 1115.53(1+) | 1.013 | |
| 2 | VQAPAAHNR | 482.25(2+) | 490.23(2+) | 1.028 | |
| 3 | GLTGSGVK | 718.40(1+) | 727.38(1+) | 1.033 | |
| 4 | VAVLDTGISTHPDLNIR | 911.49(2+) | 922.45(2+) | 0.997 | |
| 5 | GGASFVPGEPSTQDGNGHGTHVAGTIAALDNSIGVLGVAPSAELYAVK | 1531.09(3+) | 1549.71(3+) | 1.049 | |
| 5 (subtilisin) | N | 1530.77(3+) | - | | 0.981 |
| 6 | VLGASGSGAISSIAQGLEWAGNNGMHVANLSLGSPSPSATLEQAVNSATSR | 1642.14 | 1663.08(3+) | 0.979 | |
| 6 (subtilisin) | SV | 1642.80(3+) | - | | 1.003 |
| 7 | GVLVVAASGNSGAGSISYPAR | 967.51(2+) | 979.47(2+) | 1.042 | |
| 8 | YANAMAVGATDQNNNR | 855.38(2+) | 867.34(2+) | 0.971 | |
| 9 | ASFSQYGAGLDIVAPGVNVQSTYPGSTYASLNGTSMATPHVAGAAALVK | 1600.46(3+) | 1619.07(3+) | 1.010 | |
| 10-11 | QK NPSWSNVQIR | 729.38(2+) | 739.35(2+) | 1.044 | |
| 12 | NHLK | 511.29(1+) | 519.27(1+) | 1.021 | |
| 13 | NTATSLGSTNLYGSGLVNAEAATR | 1185.08(2+) | 1200.04(2+) | 1.028 | |
| | | average peak area ratio: | | 1.018 ±2.5% | |
| | | average peak area ratio: | | | 0.992 ±1.6% |
| | | average ratio of both methods: | | 1.005 ±1.3% | |
| | | intended ratio: | | 1.000 | |

FIG._6

Table II. Ratio of Concentration and Catalytic Activity (Conversion Factor) of 13 Variants Generated from Subtilisin-DAI and Expresssed in Microtiter Plates[1]

| | Conversion by Peptide Mapping with $^{15}N$-Internal Protein Standard | | |
|---|---|---|---|
| Variant | EL3.16 | OS36.7 | EL3.17 |
| Clone 1 | 0.035 | 0.015 | 0.021 |
| Clone 2 | 0.037 | 0.014 | 0.021 |
| Clone 3 | 0.035 | 0.015 | 0.019 |
| Clone 4 | 0.038 | 0.014 | - |
| Clone 5 | 0.038 | 0.014 | - |
| | Conversion by MBI Titration | | |
| Clone 1 | 0.036 | 0.015 | 0.020 |

*FIG._7*

[1]Clones within the three groups, EL3.16, OS36.7, and EL3.17 had the same sequence. Activity was measured by the suc-AAPF-pNA assay (Hsia et al., 1996). The concentration was measured by the peptide mapping method with $^{15}N$-labeled subtilisin-DAI as internal standard. The range of concentrations was 2 to 5 $\mu g \cdot ml^{-1}$. The conversion factor was verified by an active site titration with a mung bean inhibitor (MBI) solution calibrated on the same plate with a previously calibrated solution of subtilisin-DAI (Hsia et al., 1996).

SEQUENCE LISTING

```
<160> NUMBER OF SEQ ID NOS: 15

<210> SEQ ID NO 1
<211> LENGTH: 9
<212> TYPE: PRT
<213> ORGANISM: Artificial Sequence
```

-continued

<220> FEATURE:
<223> OTHER INFORMATION: tryptic peptide of BPN'

<400> SEQUENCE: 1

Ser Ser Leu Glu Asn Thr Thr Thr Lys
1 5

<210> SEQ ID NO 2
<211> LENGTH: 15
<212> TYPE: PRT
<213> ORGANISM: Artificial Sequence
<220> FEATURE:
<223> OTHER INFORMATION: tryptic peptide of BPN'

<400> SEQUENCE: 2

Ala Pro Ala Leu His Ser Gln Gly Tyr Thr Gly Ser Asn Val Lys
1 5 10 15

<210> SEQ ID NO 3
<211> LENGTH: 10
<212> TYPE: PRT
<213> ORGANISM: Artificial Sequence
<220> FEATURE:
<223> OTHER INFORMATION: tryptic peptide of BPN'

<400> SEQUENCE: 3

His Pro Asn Trp Thr Asn Thr Gln Val Arg
1 5 10

<210> SEQ ID NO 4
<211> LENGTH: 10
<212> TYPE: PRT
<213> ORGANISM: Artificial Sequence
<220> FEATURE:
<223> OTHER INFORMATION: tryptic co-digest of 15N-subtilisin DAI and subtilisin

<400> SEQUENCE: 4

Ala Gln Ser Val Pro Trp Gly Ile Ser Arg
1 5 10

<210> SEQ ID NO 5
<211> LENGTH: 9
<212> TYPE: PRT
<213> ORGANISM: Artificial Sequence
<220> FEATURE:
<223> OTHER INFORMATION: tryptic co-digest of 15N-subtilisin DAI and subtilisin

<400> SEQUENCE: 5

Val Gln Ala Pro Ala Ala His Asn Arg
1 5

<210> SEQ ID NO 6
<211> LENGTH: 8
<212> TYPE: PRT
<213> ORGANISM: Artificial Sequence
<220> FEATURE:
<223> OTHER INFORMATION: tryptic co-digest of 15N-subtilisin DAI and subtilisin

<400> SEQUENCE: 6

Gly Leu Thr Gly Ser Gly Val Lys
1 5

-continued

```
<210> SEQ ID NO 7
<211> LENGTH: 17
<212> TYPE: PRT
<213> ORGANISM: Artificial Sequence
<220> FEATURE:
<223> OTHER INFORMATION: tryptic co-digest of 15N-subtilisin DAI and
      subtilisin

<400> SEQUENCE: 7

Val Ala Val Leu Asp Thr Gly Ile Ser Thr His Pro Asp Leu Asn Ile
 1               5                  10                  15

Arg


<210> SEQ ID NO 8
<211> LENGTH: 48
<212> TYPE: PRT
<213> ORGANISM: Artificial Sequence
<220> FEATURE:
<223> OTHER INFORMATION: tryptic co-digest of 15N-subtilisin DAI and
      subtilisin

<400> SEQUENCE: 8

Gly Gly Ala Ser Phe Val Pro Gly Glu Pro Ser Thr Gln Asp Gly Asn
 1               5                  10                  15

Gly His Gly Thr His Val Ala Gly Thr Ile Ala Ala Leu Asp Asn Ser
            20                  25                  30

Ile Gly Val Leu Gly Val Ala Pro Ser Ala Glu Leu Tyr Ala Val Lys
        35                  40                  45


<210> SEQ ID NO 9
<211> LENGTH: 51
<212> TYPE: PRT
<213> ORGANISM: Artificial Sequence
<220> FEATURE:
<223> OTHER INFORMATION: tryptic co-digest of 15N-subtilisin DAI and
      subtilisin

<400> SEQUENCE: 9

Val Leu Gly Ala Ser Gly Ser Gly Ala Ile Ser Ser Ile Ala Gln Gly
 1               5                  10                  15

Leu Glu Trp Ala Gly Asn Asn Gly Met His Val Ala Asn Leu Ser Leu
            20                  25                  30

Gly Ser Pro Ser Pro Ser Ala Thr Leu Glu Gln Ala Val Asn Ser Ala
        35                  40                  45

Thr Ser Arg
    50


<210> SEQ ID NO 10
<211> LENGTH: 21
<212> TYPE: PRT
<213> ORGANISM: Artificial Sequence
<220> FEATURE:
<223> OTHER INFORMATION: tryptic co-digest of 15N-subtilisin DAI and
      subtilisin

<400> SEQUENCE: 10

Gly Val Leu Val Val Ala Ala Ser Gly Asn Ser Gly Ala Gly Ser Ile
 1               5                  10                  15

Ser Tyr Pro Ala Arg
            20
```

-continued

<210> SEQ ID NO 11
<211> LENGTH: 16
<212> TYPE: PRT
<213> ORGANISM: Artificial Sequence
<220> FEATURE:
<223> OTHER INFORMATION: tryptic co-digest of 15N-subtilisin DAI and subtilisin

<400> SEQUENCE: 11

Tyr Ala Asn Ala Met Ala Val Gly Ala Thr Asp Gln Asn Asn Asn Arg
1 5 10 15

<210> SEQ ID NO 12
<211> LENGTH: 49
<212> TYPE: PRT
<213> ORGANISM: Artificial Sequence
<220> FEATURE:
<223> OTHER INFORMATION: tryptic co-digest of 15N-subtilisin DAI and subtilisin

<400> SEQUENCE: 12

Ala Ser Phe Ser Gln Tyr Gly Ala Gly Leu Asp Ile Val Ala Pro Gly
1 5 10 15

Val Asn Val Gln Ser Thr Tyr Pro Gly Ser Thr Tyr Ala Ser Leu Asn
20 25 30

Gly Thr Ser Met Ala Thr Pro His Val Ala Gly Ala Ala Ala Leu Val
35 40 45

Lys

<210> SEQ ID NO 13
<211> LENGTH: 12
<212> TYPE: PRT
<213> ORGANISM: Artificial Sequence
<220> FEATURE:
<223> OTHER INFORMATION: tryptic co-digest of 15N-subtilisin DAI and subtilisin

<400> SEQUENCE: 13

Gln Lys Asn Pro Ser Trp Ser Asn Val Gln Ile Arg
1 5 10

<210> SEQ ID NO 14
<211> LENGTH: 4
<212> TYPE: PRT
<213> ORGANISM: Artificial Sequence
<220> FEATURE:
<223> OTHER INFORMATION: tryptic co-digest of 15N-subtilisin DAI and subtilisin

<400> SEQUENCE: 14

Asn His Leu Lys
1

<210> SEQ ID NO 15
<211> LENGTH: 24
<212> TYPE: PRT
<213> ORGANISM: Artificial Sequence
<220> FEATURE:
<223> OTHER INFORMATION: tryptic co-digest of 15N-subtilisin DAI and subtilisin -continued

```
<400> SEQUENCE: 15

Asn Thr Ala Thr Ser Leu Gly Ser Thr Asn Leu Tyr Gly Ser Gly Leu
 1               5                  10                  15

Val Asn Ala Glu Ala Ala Thr Arg
            20
```

MASS SPECTROMETRIC ANALYSIS OF BIOPOLYMERS

CROSS-REFERENCE TO RELATED APPLICATIONS

This application is a continuation of U.S. application Ser. No. 09/932,369, filed on Aug. 17, 2001, now abandoned, which claims benefit of and priority to U.S. Ser. No. 60/228,198, entitled "Mass Spectrometric Analysis of Blopalymers," filed Aug. 25, 2000, by Christian Peech et al.

FIELD OF THE INVENTION

The present invention relates to the analysis of biopolymers in crude solutions. In particular, the invention relates to the determination, quantitation, and identification of biopolymers, such as polypeptides and oligonucleotides, using mass spectroscopic data obtained from fractioned mixtures.

REFERENCES

Allen G (1989) *Sequencing of Proteins and Peptides.* 2nd edn. Elsevier, Amsterdam.

Bairoch A, Apweiler R (2000) The SWISS-PROT protein sequence database and its supplement TrEMBL in 2000. Nucleic Acids Res 28:45-48.

Burks C, et al. (1990) GenBank: current status and future directions. Methods Enzymol 183:3-22.

Chowdhury S K et al. (1995) Examination of Recombinant Truncated Mature Human Fibroblast Collagenase by Mass Spectrometry: Identification of Differences with the Published Sequence and Determination of Stable Isotope Incorporation. Rapid Communications in Mass Spectrometry 9:563-569.

Christianson T, Paech C (1994) Peptide mapping of subtilisins as a practical tool for locating protein sequence errors during extensive protein engineering projects. Anal Biochem 223:119-129.

Corthals G. L., et al. (1999) Identification of proteins by mass spectrometry, in *Proteome research*: *2D gel electrophoresis and detection methods*, Ed. Rabilloud, T., Springer, New York, pp. 197-231.

Deutscher M P, ed (1990) *Guide to Protein Purification.* Academic Press, New York.

George D G, et al. (1996) PIR-International Protein Sequence Database. Methods Enzymol 266:41-59.

Goddette D W, et al. (1992) The crystal structure of the *Bacillus lentus* alkaline protease, subtilisin BL, at 1.4 Å resolution. J Mol Biol 228:580-595.

Guermant C, et al. (2000) Under proper control, oxidation of proteins with known chemical structure provides an accurate and absolute method for the determination of their molar concentration. Anal Biochem 277:46-57.

Gygi S P, et al. (1999) Quantitative analysis of complex protein mixtures using isotope-coded affinity tags. Nat Biotechnol 17:994-999.

Hancock W S, ed (1996) *New Methods in Peptide Mapping for the Characterization of Proteins.* CRC Press, Boca Raton.

Hsia C, et al. (1996) Active-site titration of serine proteases using a fluoride ion selective electrode and sulfonyl fluoride inhibitors. Anal Biochem 242:221-227.

Janson J C, Rydén L, eds (1998) *Protein Purification.* 2nd edn. Wiley-Liss, New York.

Kahn P, Cameron G (1990) EMBL Data Library. Methods Enzymol 183:23-31.

Kellner R, Lottspeich F, Meyer H E, eds (1999) *Microcharacterization of Proteins.* 2nd edn. Wiley-VCH, Weinheim.

Kunst F, et al. (1997) The complete genome sequence of the gram-positive bacterium *Bacillus subtilis.* Nature 390: 249-256.

Lahm H W, Langen H (2000) Mass spectrometry: a tool for the identification of proteins separated by gels. Electrophoresis 21:2105-2114.

Matsudaira P, ed (1993) *A Practical Guide to Protein and Peptide Purification for Microsequencing.* 2nd edn. Academic Press, San Diego.

Oda Y, et al. (1999) Accurate quantitation of protein expression and site-specific phosphorylation. Proc Natl Aced Sci USA 96:6591-6596.

Pace C N, et al. (1995) How to measure and predict the molar absorption coefficient of a protein. Protein Sci 4:2411-2423.

Scopes R (1994) *Protein Purification.* 3rd edn. Springer-Verlag, New York.

Stocklin et al., (1997) A Stable Isotope Dilution Assay for the In Vivo Determination of Insulin Levels in Humans by Mass Spectrometry. Diabetes 46:44-50.

BACKGROUND OF THE INVENTION

Protein concentration determination is at the heart of any study concerned with the catalytic efficiency of an enzyme. Even for highly purified enzymes the choice of first-principle methods for accurately measuring molar concentrations is restricted to a few techniques (amino acid, total nitrogen, and absorbance measurement (Pace et al., 1995), titration of oxidized sulfur (Guermant et al., 2000). For enzymes in crude solution the options are even smaller and techniques are much more elaborate (e.g., active-site titrations involving the stoichiometric release of a reporter group, enyme-linked immunosorbent assay (ELISA), densitometry after sodium dodecylsulfate polyacrylamide gel electrophoresis (SDS-PAGE)). Catalytic rate assays while highly specific for an enzyme and often quantitative in nature presuppose validation with purified enzyme which in turn requires first-principle methods for accurate mass quantitation.

The determination of the concentration of a specific protein among other proteins in crude solution, such as a fermenter broth, is a formidable challenge. Even more demanding is the task of verifying the presence of a specific protein and the quantitation of this protein in a cell or tissue extract without knowing the properties of the protein and ever having seen it before.

Most methods for estimating protein concentration are built on general properties of proteins, e.g., the chemistry and light absorbance of aromatic side chains and the peptide bond, and the binding affinity for chromophores. More specific techniques, e.g. immunoassay and active site titration, require some prior knowledge of the targeted protein. All such methods, however, suffer from interferences, as the extensive literature on protein assays documents, and none of the methods takes advantage of that one unique feature that differentiates non-identical proteins, the amino acid sequence. On that level there is no interference possible.

The use of isotopically labeled biopolymers to investigate cellular processes is not new. For example, Chowdhury et al. used mass spectrometry and isotopically labeled analogs to investigate the molecular weight of truncated mature collagenase, and Stocklin et al. have investigated human insulin concentration in serum samples that had been extracted and purified. Neither one discuss the use of crude solutions to determine biopolymer concentration without prior isolation of the biopolymer.

The present invention makes use of the subunit sequence as a unique tag of a biopolymer (e.g., the amino acid sequence of a specific protein), that can be exploited for determining the concentration in crude solutions.

SUMMARY OF THE INVENTION

The present invention addresses the need for a straightforward and rapid technique for determining the specific concentration of one or more biopolymers (e.g., proteins, oligonucleotides, etc.) in a mixture, e.g., a cell-free culture fluid, a cell extract, or the entire complement of proteins in a cell or tissue.

The present invention additionally provides a method for identifying a biopolymer fragment (e.g., peptide, oligonucleotide, etc.) derived from a larger biopolymer added to a solution that otherwise lacks such a biopolymer or fragment.

In one of its aspects, the present invention provides a method for determining the absolute quantity of a target polypeptide, such as a selected protein, in a crude solution or mixture, comprising the steps of:

(a) adding a known quantity of an analog of the target polypeptide to the solution or mixture;

(b) treating the target polypeptide and analog in the solution or mixture with a fragmenting activity (e.g., a protease) to generate a plurality of corresponding peptide pairs;

(c) resolving the peptide content of the solution or mixture;

(d) determining by mass spectrometric analysis the ratio of a selected target peptide to its corresponding analog peptide; and (e) calculating, from the ratio and the known quantity of the analog, the quantity of the target polypeptide in the solution or mixture.

The solution or mixture can be, for example, a crude fermenter solution, a cell-free culture fluid, a cell extract, or a mixture comprising the entire complement of proteins in a cell or tissue.

Another aspect of the present invention provides a method for determining the absolute quantity of a target polynucleotide in a crude solution, comprising the steps of:

(a) adding a known quantity of an analog of the target polynucleotide to the solution;

(b) treating the target polynucleotide and analog with a fragmenting activity (e.g., a restriction enzyme) to generate a plurality of corresponding polynucleotide-fragment pairs;

(c) resolving the polynucleotide-fragment content of the mixture;

(d) determining by mass spectrometric analysis the ratio of a selected target polynucleotide fragment to its corresponding analog fragment; and (e) calculating, from the ratio and the known quantity of the analog, the quantity of the target oligonucleotide in the mixture.

In one embodiment, the target polynucleotide is an oligonucleotide.

Yet a further aspect of the present invention provides a method for verifying the presence and, optionally, determining the absolute quantity of a selected putative polypeptide, such as a protein, in a mixture containing a plurality of isotope-labeled cellular proteins from a selected cell type. One embodiment of the method includes the steps of:

selecting a putative polypeptide potentially present in said mixture;

generating a theoretical fragmentation of the putative polypeptide;

selecting a theoretical fragment from the theoretical fragmentation;

producing a peptide having an amino acid sequence corresponding to the theoretical fragment;

adding a known amount of the produced peptide as an internal standard to the mixture;

treating the mixture with a proteolytic activity;

resolving the cellular polypeptide fragments along with the internal standard and analyzing the same by mass spectrometry to provide a mass spectrograph;

locating a peak pair from the mass spectrograph comprised of a peak representing the internal standard and a peak representing a cellular polypeptide fragment corresponding to the internal standard, thereby verifying the presence of the putative polypeptide;

optionally, upon verifying the presence of the putative polypeptide, determining the ratio of internal standard to its corresponding cellular polypeptide fragment; and, calculating, from the ratio and the known quantity of the internal standard, the absolute quantity of the putative polypeptide in the mixture.

The putative polypeptide can be derived, for example, from a database of sequence information.

Preferably, in connection with the fragmentation step, the fragmentation of the cellular polypeptide is determined to be substantially complete with respect to the cellular polypeptide fragment corresponding to the internal standard.

One embodiment provides the additional steps of:

after determining the absolute quantity of the putative polypeptide in the mixture, growing the selected cell type under a set of defined conditions, querying an extract from the grown cell type for the presence, for an increase or decrease of the absolute concentration of the putative polypeptide by mixing the extract with a known amount of the isotope-labeled mixture as a new internal standard;

treating the extract with a proteolytic activity;

resolving the polypeptide fragment content of the extract and analyzing the same by mass spectrometry to provide a mass spectrograph;

locating a peak pair from said mass spectrograph comprised of a peak representing the new internal standard and a peak representing a cellular polypeptide fragment corresponding to the new internal standard, thereby verifying the presence of the putative polypeptide;

optionally, upon verifying the presence of the putative polypeptide, determining the ratio of the new internal standard to its corresponding cellular polypeptide fragment; and, calculating, from the ratio and the known quantity of the internal standard, the absolute quantity of the putative polypeptide in the extract.

In another of its aspects, the present invention provides a cell-culture extract, derived from a selected microorganism grown on media enriched in a specific isotope, said extract containing a known amount of a metabolically labeled polypeptide determined by a peptide-separation technique in combination with mass spectroscopy.

A further aspect of the present invention provides a method for determining the identity of a target polypeptide fragment in a solution, comprising the steps of:

(a) adding an analog of the target polypeptide and the target polypeptide to the solution, in a selected fixed analog:target ratio;

(b) treating the target polypeptide and analog with a fragmenting activity to generate a plurality of corresponding peptide pairs;

(c) resolving the peptide content of the solution;

(d) identifying by mass spectrometric analysis those fragment pairs that exhibit the selected ratio; and, optionally, (e) determining the amino acid sequence of the fragment pairs identified in step (d).

In one embodiment, the target polypeptide is a protein.

In another embodiment, the crude solution contains a plurality of different proteins. For example, the solution can be a crude fermenter solution, a cell-free culture fluid, a cell extract, a mixture comprising the entire complement of proteins in a cell or tissue, etc.

Other objects, features and advantages of the present invention will become apparent from the following detailed description. It should be understood, however, that the detailed description and specific examples, while indicating preferred embodiments of the invention, are given by way, of illustration only, since various changes and modifications within the scope and spirit of the invention will become apparent to one skilled in the art from this detailed description.

BRIEF DESCRIPTION OF THE DRAWINGS

FIG. 3. Rapid tryptic digest of subtilin-DAI and $^{5}$N-subtilisin-DAI and separation of peptides by RP-HPLC on a 2.0×50 mm C18 column (Jupiter, by Phenomenex). The quantitation by TIC peak area integration of corresponding peaks gave the result expected from enzyme activity assays and active site titrations (see FIGS. 1 and 2).

FIG. 4. (A) SDS-PAGE of a fermentation broth concentrate of unknown origin. (B) This material spiked with a known amount of $^{15}$N-labeled purified subtilisin BPN'-Y217L and was digested with trypsin. The peptide mixture was separated by RP-HPLC on a C18 column (2.1×150 mm) and the eluate was recorded at 215 nm.

FIG. 6. Table I.: Sequence comparison, m/z values, and ratios of integrated TIC peak areas and UV absorbance peak areas for chromatogram in FIG. 1. The concentration measured by the co-digest technique for subtilisn and subtilisin-DAI was 8.15 and 7.13 mg/ml, respectively, while the given concentration (established by independent methods) was 7.99 and 7.03mg/ml, respectively. The sequences shown are: AQSVPWGISR (SEQ ID NO:4), VQAPAAHNR (SEQ ID NO:5), GLTGSGVK (SEQ ID NO:6), VAVLDTGISTHPDLNIR (SEQ ID NO:7), GGASFVPGEPSTQDGNGHGTHVAGTIAALDNSIGVLGVAPSAELYAVK (SEQ ID NO:8), VLGASGSGAISSIAQGLEWAGNNGMHVANSGSPSPSATLEQAVNSATSR (SEQ ID NO:9), GVLVVAASGNSGAGSISYPAR (SEQ ID NO:10), YANAMAVGATDQNNNR (SEQ ID NO:11), ASFSQYGAGLDIVAPGVNVQSTYPGSTYASLNGTSMATPHVAGAAALVK (SEQ ID NO:12), QKNPSWSNVQIR (SEQ ID NO:13), NHLK (SEQ ID NO:14), and NTATSLGSTNLYGSGLVNAEAATR (SEQ ID NO:15).

FIG. 7. Table II. Determination of concentration, activity and conversion factor for subtilisin-DAI variants determined by peptide mapping ($^{15}$N-isotope method) and by active site titration with a calibrated mung bean inhibitor solution using as internal standard a previously calibrated solution of subtilisin-DAI (Hsia et al., 1996). The range of target protein concentrations was 2 to 5 $\mu g \cdot ml^{-1}$.

DETAILED DESCRIPTION OF THE INVENTION

Figure 1:
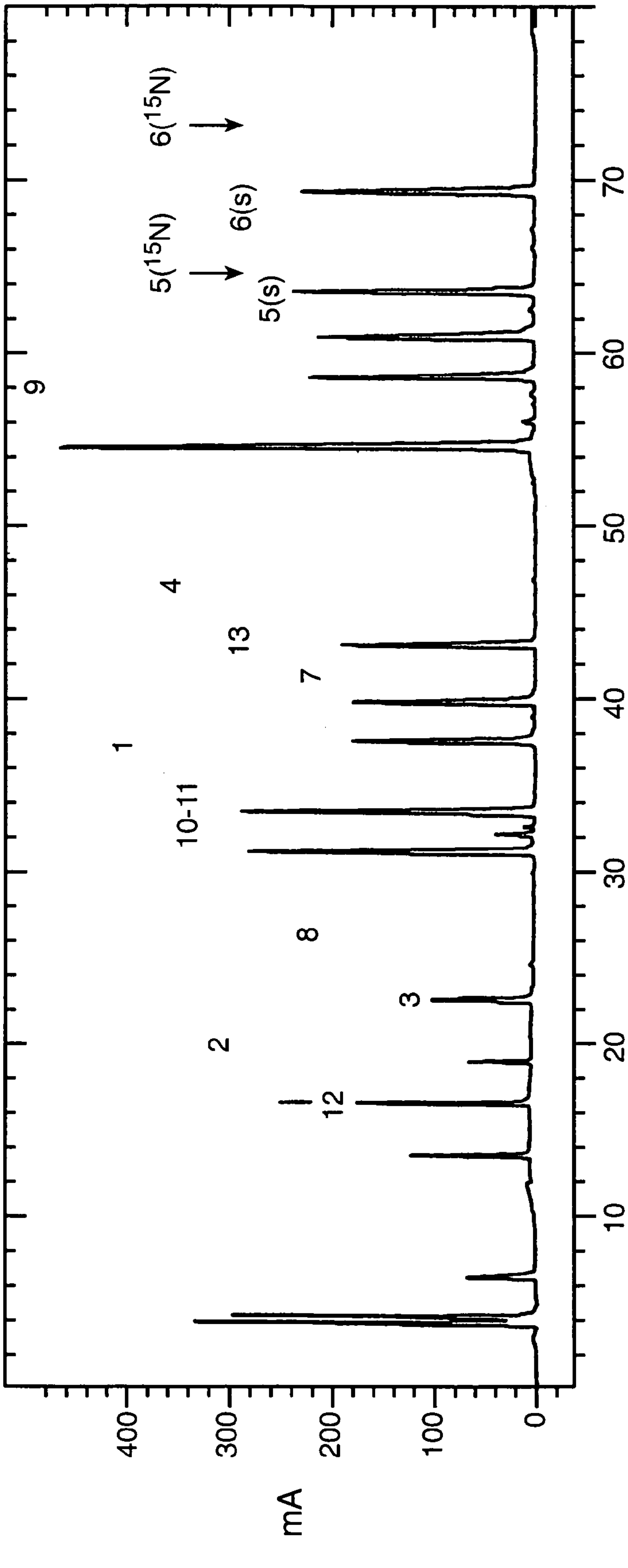
FIG. 1. UV traces of a tryptic co-digest of $^{15}$N-subtilisin-DAI, indexed ($^{15}$N), and subtilisin, indexed (s). Peptide numbering refers to Table I.

The invention will now be described in detail by way of reference only using the following definitions and examples. All patents and publications, including all sequences disclosed within such patents and publications, referred to herein are expressly incorporated by reference.

The present invention provides methods for the quantitation of biopolymers in crude, i.e., unpurified, solutions.

DEFINITIONS

Unless defined otherwise herein, all technical and scientific terms used herein have the same meaning as commonly understood by one of ordinary skill in the art to which this invention belongs. Singleton, et al., Dictionary of Microbiology and Molecular Biology, 2d Ed., John Wiley and Sons, New York (1994), and Hale & Marham, The Harper Collins Dictionary of Biology, Harper Perennial, NY (1991) provide one of skill with a general dictionary of many of the terms used in this invention. Although any methods and materials similar or equivalent to those described herein can be used in the practice or testing of the present invention, the preferred methods and materials are described. Numeric ranges are inclusive of the numbers defining the range. Unless otherwise indicated, nucleic acids are written left to right in 5' to 3' orientation; amino acid sequences are written left to right in amino to carboxy orientation, respectively. The headings provided herein are not limitations of the various aspects or embodiments of the invention which can be had by reference to the specification as a whole. Accordingly, the terms defined immediately below are more fully defined by reference to the specification as a whole.

Biopolymer

The term “biopolymer” as used herein means any large polymeric molecule produced by a living organism. Thus, it refers to nucleic acids, polynucleotides, polypeptides, proteins, polysaccharides, carbohydrates, lipids and analogues thereof. The terms “biopolymer” and “biomolecule” are used interchangeably herein.

Isolated

As used herein an “isolated” biomolecule (such as a nucleic acid or protein) has been substantially separated or purified away from other biological components in the cell of the organism in which the component naturally occurs, i.e., other chromosomal and extrachromosomal DNA and RNA, and proteins. Nucleic acids and proteins which have been "isolated" thus include nucleic acids and proteins purified by standard purification methods. The term also embraces nucleic acids and proteins prepared by recombinant expression in a host cell as well as chemically synthesized nucleic acids.

Polypeptide or Protein

A macromolecule composed of one to several polypeptides. Each polypeptide consists of a chain of amino acids linked together by covalent (peptide) bonds. They are naturally-occurring complex organic substances composed essentially of carbon, hydrogen, oxygen and nitrogen, plus sulphur or phosphorus, which are so associated as to form sub-microscopic chains, spirals or plates and to which are attached other atoms and groups of atoms in a variety of ways. A protein may comprise one or multiple polypeptides linked together by disulfied bonds. Examples of the protein include, but are not limited to, antibodies, antigens, ligands, receptors, etc. The terms "polypeptide" and "protein" are used interchangeably herein to refer to a polymer of amino acid residues.

As the description of this invention proceeds, it will be seen that mixtures are produced which may contain individual components containing 100 or more amino acid residues or as few as one or two such residues. Conventionally, such low molecular weight products would be referred to as amino acids, dipeptides, tripeptides, etc. However, for convenience herein, all such products will be referred to as polypeptides since the mixtures which are prepared for mass spectrometric analysis contain such components together with products of sufficiently high molecular weight to be conventionally identified as polypeptides.

Polypeptides may contain amino acids other than the 20 gene encoded amino acids. "Polypeptide(s)" include those modified either by natural processes, such as processing and other post-translational modifications, but also by chemical modification techniques. Such modifications are wall described in basic texts and in more detailed monographs, as well as in a voluminous research literature, and they are well known to those of skill in the art. Polypeptides may be branched or cyclic, with or without branching. Cyclic, branched and branched circular polypeptides may result from post-translational natural processes and may be made by entirely synthetic methods, as well.

Peptide or Oligopeptide

A linear molecule composed of two or more amino acids linked by covalent (peptide) bonds. They are called dipeptides, tripeptides and so forth, according to the number of amino acids present. These terms may be used interchangeably with polypeptide. See above.

Polynucleotide

A chain of nucleotides in which each nucleotide is linked by a single phosphodiester bond to the next nucleotide in the chain. They can be double- or single-stranded. The term is used to describe DNA or RNA.

"Polynucleotide(s)" generally refers to any polyribonucleotide or polydeoxribonucleotide, which may be unmodified RNA or DNA or modified RNA or DNA. "Polynucleotide(s)" include, without limitation, single- and double-stranded DNA, DNA that is a mixture of single- and double-stranded regions or single-, and double-stranded regions, single- and double-stranded RNA, and RNA that is mixture of single- and double-stranded regions, hybrid molecules comprising DNA and RNA that may be single-stranded or, more typically, double-stranded, or a mixture of single- and double-stranded regions. The RNA may be a mRNA.

As used herein, the term "polynucleotide(s)" also includes DNAs or RNAs as described above that contain one or more modified bases. Thus, DNAs or RNAs with backbones modified for stability or for other reasons are "polynucleotide(s)" as that term is intended herein. Moreover, DNAs or RNAs comprising unusual bases, such as inosine, or modified bases, such as 4-acetylcytosine, to name just two examples, are polynucleotides as the term is used herein. It will be appreciated that a great variety of modifications have been made to DNA and RNA that serve many useful purposes known to those of skill in the art. The term "polynucleotide(s)" as it is employed herein embraces such chemically, enzymatically or metabolically modified forms of polynucleotides, as well as the chemical forms of DNA and RNA characteristic of viruses and cells, including, for example, simple and complex cells.

The length of the polynucleotides may be 10 kb. In accordance with one embodiment of the present invention, the length of a polynucleotide is in the range of about 50 bp to 10 Kb, preferably, 100 bp to 1.5 kb.

Oligonucleotide

A short molecule (usually 6 to 100 nucleotides) of single-stranded DNA. "Oligonucleotide(s)" refer to short polynucleotides, i.e., less than about 50 nucleotides in length. In a preferred embodiment, the oligonucleotides can be of any suitable size, and are preferably 24-48 nucleotides in length. In accordance with another embodiment of the present invention, the length of a synthesized oligonucleotide is in the range of about 3 to 100 nucleotides. In accordance with a further embodiment of the present invention, the length of the oligonucleotide is in the range of about 15 to 20 nucleotides.

Size separation of the cleaved fragments is performed using 8 percent polyacrylamide gel described by Goeddel et al., Nucleic Acids Res., 8:4057 (1980).

Restriction Enzyme

Restriction enzyme and restriction endonuclease are used interchangeably herein and refer to a protein that recognizes specific, short nucleotide sequences and cuts the DNA at those sites. There are three types of restriction endonuclease enzymes:

Type I: Cuts non-specifically a distance greater than 1000 bp from its recognition sequence and contains both restriction and methylation activities.

Type II: Cuts at or near a short, and often palindromic recognition sequence. A separate enzyme methylates the same recognition sequence. They may make the cuts in the two DNA strands exactly opposite one another and generate blunt ends, or they may make staggered cuts to generate sticky ends. The type II restriction enzymes are the ones commonly exploited in recombinant DNA technology.

Type III: Cuts 24-26 bp downstream from a short, asymmetrical recognition sequence. Requires ATP and contains both restriction and methylation activities.

The present invention contemplates the fragmentation of polynucleotides with restriction enzymes. In a preferred embodiment the restriction enzyme is a Type II. The fragment polynucleotides are then resolved into individual components based on size.

THE INVENTION

In one of its aspects, the present invention makes use of the biomolecule (e.g., amino acid or nucleotide) sequence as a unique tag of a specific biopolymer (e.g., polypeptide or polynucleotide) that can be exploited for determining biopolymer concentration or identity in crude solutions, e.g., a crude fermenter solution, a cell-free culture fluid, a cell or tissue extract, etc. In one general embodiment, a target biomolecule is selected for analysis and an analog thereof is generated. The analog is purified and calibrated, and a known amount is added as an internal standard to the solution to be assayed. The biopolymers of the mixture are then fragmented, e.g., by proteolytic digestion for proteins, and the resulting biomolecule-fragments are resolved, e.g., by way of chromatography. One or more corresponding biomolecule-fragments pairs are then identified and analyzed by selected ion monitoring of a mass spectrometer.

According to one general embodiment, a target polypeptide is selected for analysis and an analog of the target polypeptide is generated. The target protein can be, for example, a protein that is known to be in a mixture, a putative protein (e.g., derived from a genome database search) that is potentially present in a mixture, or a known or putative protein segment or fragment (peptide). The analog of the target polypeptide can be the target polypeptide itself or a unique segment or fragment (peptide) of the target polypeptide. One or the other of the target polypeptide and analog is labeled so that the two can be distinguished from one another in subsequent mass analysis. The analog is purified and its absolute quantity is determined in a solid quantity or in a solution by standard techniques (the analog is now said to be 'calibrated'), and a known amount is employed as an internal standard in the solution to be assayed. The polypeptides of the mixture are treated with a fragmenting activity, and the peptide components of the mixture are then resolved. Corresponding peptide pairs are then analyzed by selected ion monitoring of a mass spectrometer. Peak area integration of such peptide pairs provides a direct measure for the amount of target polypeptide in the crude solution.

According to another embodiment, a target polynucleotide is selected for analysis and an analog of the target polynucleotide is generated. The target polynucleotide can be, for example, a gene sequence that is known to be in a mixture, a putative gene (e.g., derived from a genome database search) that is potentially present in a mixture, or a known or putative polynucleotide or fragment (oligonucleotide). The analog of the target polynucleotide can be the target polynucleotide itself or a unique segment or fragment (oligonucleotide) of the target polynucleotide. One or the other of the target polynucleotide and analog is labeled so that the two can be distinguished from one another in subsequent mass analysis. The analog is purified and its absolute quantity is determined in a solid quantity or in a solution by standard techniques (the analog is now said to be 'calibrated'), and a known amount is employed as an internal standard in the solution to be assayed. The polynucleotides of the mixture are treated with a fragmenting activity, and the oligonucleotide components of the mixture are then resolved. Corresponding nucleotide-fragment pairs are then analyzed by selected ion monitoring of a mass spectrometer. Peak area integration of such nucleotide-fragment pairs provides a direct measure for the amount of target polynucleotide in the crude solution.

In yet another embodiment, the biomolecule analog is labeled with a suitable stable isotope and calibrated. The sample containing (or suspected of containing) the biomolecule of interest is aliquoted out such that the final concentration (after addition of the analog) in each aliquot is the same. Then decreasing amounts of the known labeled biomolecule analog is added to each aliquot. Each aliquot is subjected to mass spectrometry and their spectra analyzed for peaks corresponding to the labeled and unlabeled biomolecule of interest. Corresponding biomolecule peaks of the same magnitude, i.e., where the peak area ratio of labeled: unlabeled biomolecule equals one, indicates that the concentrations of each are the same. Thus, one is able to determine the concentration of the unlabeled biomolecule of interest from the sample with the known concentration of the labeled analog when the ratio equals one.

In a further embodiment, neither the biomolecule of interest nor the analog are labeled with a stable isotope. A known quantity of the analog is added in decreasing amounts to aliquots of the sample to be analyzed to yield a contaminated sample. The contaminated sample is treated with a fragmenting activity, and the biomolecule components of the mixture resolved. The resolved biomolecule-fragments, i.e., the corresponding biomolecule-fragment pairs, are then analyzed by mass spectrometry. The contribution of the unlabeled contaminant will decrease as its concentration in the sample of interest decreases. At some concentration the contribution of the unlabeled analog to the spectral analysis becomes negligible and the concentration of the biomolecule of interest can be determined. The concentration of the biomolecule of interest is determined by the intensity of the signal when the contribution of the analog is negligible and known concentration of the analog.

Isotope Labeling of Proteins

Labeling of the target or analog can be effected by any means known in the art. For example, a labeled protein or peptide can be synthesized using isotope-labeled amino acids or peptides as precursor molecules. Preferred labeling techniques utilize stable isotopes, such as $^{18}O$, $^{15}N$, $^{13}C$, or $^{2}H$, although others may be employed. Metabolic labeling can also be used to produce labeled proteins and peptides. For example, cells can be grown on a media containing isotope-labeled precursor molecules. Particularly, an organism can be grown on $^{15}N$-labeled organic or inorganic material, such as urea or ammonium chloride, as the sole nitrogen source. See Example 5.

In a preferred method, biopolymers are labeled with 15N. The following is a preferred protocol.

This protocol may be used to produce $^{15}N$-labeled biomolecules. Due to the fact that the only source of nitrogen is urea, this media lends itself to being a very cost-effective way to label proteins (the cell and all of its components as well) with $^{15}N$. The one caveat is that the host organism must be able to grow and produce the target protein in a defined media. A preferred host is *Bacillus subtilis*. Purification is made easier because the unwanted proteins are usually at level(s) lower than the target protein reducing the amount of contaminants to separate from this protein. The protocol is as follows:

1) Media Preparation, Innoculation and Growth

These are the media and shake flask conditions preferred in the preparation of labeled biopolymers.

MOPS Medium-10× Base for 1.0 L Volume

To a Milli-Q rinsed beaker add with stirring:

| | |
|---|---|
| Milli-Q water | 750 mL |
| MOPS | 83.72 gm |
| Tricine | 7.17 gm |
| KOH Pellets | 12.00 gm |
| $K_2SO_4$ (Potassium Sulfate) 0.276M Stock | 10.00 mL |
| $MgCl_2$ (Magnesium Chloride) 0.528M Stock | 10.00 mL |
| NaCl (Sodium Chloride) | 29.22 gm |
| Micronutrients - 100X Stock (previously made; recipe below) | 100.00 mL |

Dissolve MOPS and Tricine, then add KOH. Add the remaining ingredients. Adjust the pH of the solution to 7.4 by addition of more KOH pellets (don't use a KOH solution as that could effect the final volume >1 L). Generally ~2.13 gm of additional KOH pellets are needed, be careful to ensure all KOH is solubilized before making additions of KOH pellets. With the pH at 7.4 adjust the liquid volume to 1.0 L with additional Milli-Q water and after allowing the solution to mix well sterile-filter through a 0.22 um filter unit.

Refrigeration of this media will help storage life, but it has been found that after ~1.5 to 2 months the MOPS media production level (for protease) decreases.

100× Micronutrients 1.00 Liter

Add the following ingredients, sequentially, to 1 L Milli-Q water mix to solubilize then sterile filter through a 0.22 μm filter unit. (Note: the actual volume will be 1.02 L)

| | |
|---|---|
| $FeSO_4$*$7H_2O$ (Ferrous Sulfate, Heptahydrate) | 400 mg |
| $MnSO_4$*$H_2O$ (Manganese Sulfate, Monohydrate) | 100 mg |
| $ZnSO_4$*$7H_2O$ (Zinc Sulfate, Heptahydrate) | 100 mg |
| $CuCl_2$*$2H_2O$ (Cupric Chloride, Dihydrate) | 50 mg |
| $CoCl_2$*$6H_2O$ (Cobalt Chloride, Hexahydrate | 100 mg |
| $NaMoO_4$*$2H_2O$ (Sodium Molybdate, Dihydrate) | 100 mg |
| $Na_2B_4O_7$*$10H_2O$ (Sodium Borate, Decahydrate) | 100 mg |
| $CaCl_2$ (Calcium Chloride) 1M Stock | 10 mL |
| $C_6H_5Na_3O_7$*$2H_2O$ (Sodium Citrate, Dihydrate) 0.5M Stock | 10 mL |

Shake Flask Media: (For 1 L Volume)

| | |
|---|---|
| 10X Mops | 100 mL |
| 21% Glucose/35% Maltrin M150 stock solution | 100 mL |
| $^{15}N$-labeled Urea($^{15}N_2$ Urea, 99 Atom %) | 3.6 gm |
| $K_2HPO_4$(Potassium Phosphate, DiBasic) | 523 mg |
| $dH_2O$ | |

Mix the above ingredients and add deionized H2O to 1 L volume. Mix well and adjust the pH to 7.3 (or predetermined best production pH between 7.0 to 7.5) with 50% NaOH. Add antibiotic(s) to desired concentration (e.g., 1 mL of a 25 mg/mL chloramphenicol (Cmp) solution added to this volume will give a 25 ppm Cmp concentration) Sterile filter through a 0.22 μm filter unit.

Shake Flask conditions: Using sterilized (e.g., autoclaved) shake flasks (bottom baffled are best for aeration of culture) use a 10 to 20% liquid volume (eg 50 mL in a 250 mL shake flask or 300 mL in a 2800 mL Fernbach)). For example, for protease production a 10 to 15% volume works well, for amylase production a 20% volume works well.

Inoculation and Growth: Cultures should be inoculated from thawed and mixed glycerol stocks (which were made in the Mops/Urea media prior to the labeling experiment) at the level of 150 μL per 250 mL shake flask or 1 vial (1.5 mL) per 2800 mL shake flask. Once inoculated the cultures should be grown at 37° C. and 325 to 350 rpm for ~60 hrs (spo− host, cutinase production), ~72 hrs (spo− host) for protease production and ~90 hrs (spo+ host or amylase production), to achieve a maximum yield.

2) Harvesting the culture(s) Once the titers have reached their optimum level (or reasonably close as predetermined in earlier experiments) the cultures should be harvested as the titers will only decrease and background biopolymers and by products will make the purification/isolation more difficult. Remove the shake flasks from the incubator and measure the activities from each culture (along with O.D. and pH). If all the activities are at a desirable level the cultures are pooled, and the pH is adjusted to ~6.0 with acetic acid, (add slowly so that the resulting pH doesn't drift lower than the target pH). Centrifuge the broth immediately using centrifuge bottles appropriate for the amount of culture broth obtained. The material may be centrifuged at a high rpm (e.g., 12,000 rpm for 250 mL bottles) for 30 minutes. Filter the supernatants through 0.8 micron filters (Nalgene or Coming 1 L units are preferred). Measure the total titer of this supernatant. The cell pellets can be saved, stored at −70° C., and used in future experiments as all of this material is labeled with $^{15}N$.

3) Concentrating the Supernatant This step should be done in a cold room.(4° C.) to minimize recovery loss. Use 400 mL stirred cell(s) (Amicon 8400 series, 76 mm diameter membranes) with a 10,000 MWCO membrane (PM, polysulfone, is best, but may retain hydrophobic molecules). Add 350 mL of the supernatant to each of the stirred cells, it is assumed that at least 1000 mL of supernatant is available. Cap the units with their appropriate top and connect to a nitrogen line (50 psi input), open the pressurizing valve on the unit and start concentrating. These units should be put on a multicell stir plate with ~130 rpm stirring action. Add more supernatant to the cell(s) as the level goes down in the cell (usually 50-100 mL at a time), make sure to collect the permeate in an appropriate-beaker in case of a leak through the membrane. When all of the supernatant has been concentrated to at least one-tenth the original volume (e.g., 3000 mL concentrated to 300 mL) stop concentrating the material. Remove all the liquid from each stirred cell to a graduated cylinder, making sure to rinse the sides, stir bar and membrane off with a minimal amount of deionized water. This volume should be measured and an (activity) assay done to check the concentration of the labeled protein so that the total labeled protein available can be calculated (assays can be done on the permeate(s) to check for loss, also this material can be frozen away because all the protein components are labeled).

4) Dialyzing the Concentrated $^{15}N$ Biopolymer If the first step in purifying the labeled protein will be ion-exchange the concentrated material should be dialyzed into an appropriate buffer system (if not the sample is ready to be run using the desired chromatographic method/system that will give the best yield of pure $^{15}N$ biopolymer). This is set up with dialysis tubing of 10,000 MWCO (SpectraPor 7, 32 mm), filling the tubing with the concentrate, never more than 75 mL per tube, clamping off the set up and put into a graduated cylinder (in the 4° C. cold room) filled with buffer (20 mM MES, pH 5.5, 1 mM $CaCl_2$ works well for most applications) on a stir plate (slowly stirring). The quantity of buffer used is between 20 to 50 times the volume of concentrate being dialyzed, and fresh buffer should be used after 4 hours to ensure a good dialysis. It works best to let the sample dialyze overnight in the second buffer exchange. When done the sample should be removed from the dialysis tubing very carefully so that all the protein is recovered. At this point the sample should be filtered with a 0.45 micron filter unit, activity assays should be done along with a volume measurement.

5) Purification of the $^{15}N$ Biopolymer As with any separation method one should know about the biopolymer that one is working with, because with this information it is easier to exploit specific characteristics of the molecule such as Pi, hydrophobicity, affinity or any property that will distinguish it from the others in the media. For example, ion-exchange chromatography is the preferred method used to separate the labeled proteins from their matrix and works best if the Pi of the target protein is known. Essentially the two pH ranges we have worked with so far is either pH 6.0 or pH 8.0, this involves using a cation exchange resin for binding the target protein and a salt (NaCl) gradient for elution of this protein. For good separation the load onto the column should be 25 to 35 percent of the total column capacity, a 25 cv (column volume) wash with the running buffer and a 50 to 100 cv elution gradient where the eluate is collected in fractions. This ensures that the majority of the contaminants are eliminated from the protein sample fractions which will be pooled and assayed. At this point the pool is concentrated using a stirred cell in the cold room (4° C.) and buffer exchanged/diafiltered to make another run using the either the same chromatographic procedure or a complimentary procedure involving conservative fractionation of the eluate. It is here that the pooled target biopolymer should be buffer exchanged while concentrating the sample in the buffer system that will be used for sample storage, whether frozen at minus 20° C. or formulated for future use. The amount of concentration of the sample is determined by the desired final biopolymer concentration that is needed in future use.

6) Analysis of the $^{15}$N-Biopolymer Sample for Future Reference Prior to the generation of the labeled biopolymer a pure sample of this unlabelled biopolymer should have been produced and well characterized by appropriate means. For example, for proteins SDS Page gel, activity assay, protein assay (e.g., BCA titration), amino acid analysis and a tryptic digest/peptide map along with MS analysis should have been done numerous times. With this information in hand the analysis of the labeled biopolymer is greatly facilitated as it is used for comparison to standardize the labeled biopolymer. All the analysis that was done for the unlabelled biopolymer should be done for the labeled biopolymer and compared the unlabelled biopolymer in different concentration ratios.

Purification and Calibration of Proteins and Peptides

The target biopolymer or analog, produced in isotope-labeled form either by synthesis or in vivo, can be purified by any means known in the art. For example, some extracellular alkaline proteases of microbial origin can be obtained in pure form by a single cation exchange chromatography step at pH 7.8 to 8.0 (Christianson and Paech, 1994). Other extracellular alkaline proteases can be obtained in pure form by cation exchange chromatography at pH 5.5 to 5.8 (Hsia et al., 1996), and yet other enzymes and proteins can be purified using one or more similar or different separation techniques, such as anion exchange, affinity, or hydrophobic interaction chromatography, size-exclusion chromatography, chromatofocusing, preparative isoelectrofocusing, precipitation, ultrafiltration, and others (for overviews see Deutscher, 1990, Scopes, 1994, and Janson and Rydén, 1998).

Peptides of specific sequence can be synthesized by standard techniques, purified by reverse-phase chromatography (RP-HPLC).

Once the protein or peptide is purified, a proof of purity can be ascertained, e.g. by SDS-PAGE for proteins, by RP-HPLC for peptides, the protein or peptide concentration can be determined by quantitative amino acid analysis, by total nitrogen analysis, by weight, or by light absorbance of the denatured protein (provided the amino acid sequence is known). Herein, a solution of purified protein or peptide of known protein mass content is called a ‘calibrated solution’. The solution can be stabilized, as desired, by refrigeration, freezing, or by additives such as polyols and saccharides (1,2-propanediol, glycerol, sucrose, etc.), salt (sodium chloride, ammonium sulfate, etc.), and buffers adjusted to the pH of optimal stability.

Fragmentation of Proteins

The activity used in the practice of the present invention to fragment a protein into smaller fragments can be any enzyme or chemical activity which is capable of repeatedly and accurately cleaving at particular cleavage sites. Such activities are widely known and a suitable activity can be selected using conventional practices. Examples of such enzyme or chemical activities include the enzyme trypsin which hydrolyzes peptide bonds on the carboxyl side of lysine and arginine (with the exception of lysine or arginine followed by proline), the enzyme chymotrypsin which hydrolyzes peptide bonds preferably on the carboxyl side of aromatic residues (phenylalanine, tyrosine, and tryptophan), and cyanogen bromide (CNBr) which chemically cleaves proteins at methionine residues. Trypsin is often a preferred enzyme activity for cleaving proteins into smaller pieces, because trypsin is characterized by low cost and highly reproducible and accurate cleavage sites. Techniques for carrying out enzymatic digestion are widely known in the art and are generally described by Allen, 1989, Matsudaira, 1993, Hancock, 1996, and Kellner et al., 1999.

Fragmentation of Polynucleotides

The various restriction enzymes used herein are commercially available and their reaction conditions, cofactors and other requirements would be known to the ordinarily skilled artisan. For analytical purposes, typically 1 μg of plasmid or DNA fragment is used with about 2 units of enzyme in about 20 μl of buffer solution. For the purpose of isolating DNA fragments, typically 5 to 50 μg of DNA are digested with 20 to 250 units of enzyme in a larger volume. Appropriate buffers and substrate amounts for particular restriction enzymes are specified by the manufacturer. Incubation times of about 1 hour at 37° C. are ordinarily used, but may vary in accordance with the supplier's instructions. After digestion the reaction is electrophoresed directly on a polyacrylamide gel to isolate the desired fragment.

Peptide Resolution

Any suitable separation technique can be used to resolve the peptide fragments. In one embodiment, a chromatographic column is employed comprising a chromatographic medium capable of fractionating the peptide digests as they are passed through the column. Preferred chromatographic techniques include, for example, reverse phase, anion or cation exchange chromatography, open-column chromatography, and high-pressure liquid chromatography (HPLC). Other separation techniques include capillary electrophoresis, and column chromatography that employs the combination of successive chromatographic techniques, such as ion exchange and reverse-phase chromatography. In a further embodiment, precipitation and ultrafiltration as initial clean-up steps can be part of the peptide separation protocol. Methods of selecting suitable separation techniques and means of carrying them out are known in the art. Herein, precipitation, ultrafiltration, and reverse-phase HPLC are preferred separation techniques.

Polynucleotide Resolution

Any suitable separation technique can be used to resolve the polynucleotide fragments. In one embodiment, size-based analysis of polynucleotide samples relies upon separation by gel electrophoresis (GEP). Capillary gel electrophoresis (CGE) may also be used to separate and analyze mixtures of polynucleotide fragments having different lengths, e.g., the different lengths resulting from restriction enzyme cleavage. In a preferred embodiment, the polynucleotide fragments which differ in base sequence, but have the same base pair length, are resolved by techniques known in the art. For example, gel-based analytical methods, such as denaturing gradient gel electrophoresis (DGGE) and denaturing gradient gel capillary electrophoresis (DGGC), can detect mutations in polynucleotides under "partially denaturing" conditions. Recently, a Matched Ion Polynucleotide Chromatography (MIPC) separation method has been described for the separation of polynucleotides. See U.S. Pat. No. 6,265,168.

Mass Spectrometric Identification of Peptides

Any suitable mass spectrometry instrumentation can be used in practicing the present invention, for example, an electrospray ionization (ESI) single or triple-quadrupole, or Fourier-transform ion cyclotron resonance mass spectrometer, a MALDI time-of-flight mass spectrometer, a quadrupole ion trap mass spectrometer, or any mass spectrometer with any combination of source and detector. A single quadrupole and an ion-trap ESI mass spectrometer are especially preferred herein.

General Embodiments/Examples

As used herein, "percent homology" of two amino acid sequences or of two nucleic acid sequences is determined using the algorithm of Karlin and Altschul (Proc. Natl. Acad. Sci. USA 87:2264-2268,1990), modified as in Karlin and Altschul (Proc. Natl. Acad. Sci. USA 90:5873-5877,1993). Such an algorithm is incorporated into the NBLAST and XBLAST programs of Altschul et al. (J. Mol. Biol. 215:403-410, 1990). BLAST nucleotide searches are performed with the NBLAST program, score=100, wordlength=12, to obtain nucleotide sequences homologous to a nucleic acid molecule of the invention. BLAST protein searches are performed with the XBLAST program, score=50, wordlength=3, to obtain amino acid sequences homologous to a reference polypeptide. To obtain gapped alignments for comparison purposes, Gapped BLAST is utilized as described in Altschul et al. (Nucleic Acids Res. 25:3389-3402, 1997). When utilizing BLAST and Gapped BLAST programs, the default parameters of the respective programs (e.g., XBLAST and NBLAST) are used. See http://www.ncbi.nlm.nih.gov.

A biopolymer or biopolymer fragment is said to "correspond" to an analog thereof when the biopolymer/fragment and analog have similar chemical and physical properties, but differ in at least one chemical or physical property. For example, an analog of a target polypeptide can comprise a polypeptide having an amino acid sequence identical to that of the target, the analog being formed, however, from amino acids that differ isotopically from those making up the target polypeptide. Or, the polypeptide analog can be isotopically identical to the target in terms of its amino acid content, but have an amino acid sequence that is homologous, but not identical, to the sequence of the target (e.g., the analog can have one or more amino acid substitutions, insertions, or deletions (e.g., 1, 2, 3, 4, 5, 6, 7, 8, 9, or 10 substitutions)). In one embodiment, the analog shares at least 90, 95, and/or 98 percent homology with the target biopolymer. Alternatively, the analog can be derivatized (e.g., tagged) in a fashion so as to alter at least one chemical or physical property as compared to the target. The exact manner in which the analog differs from the biopolymer is not critical, provided only that the two are capable of producing a pair of peaks that can be distinguished one from the other, yet which occur relatively close to one another, in mass spectrographic analysis (i.e., a peak pair can be identified attributable to the target and analog).

Known Protein

In one embodiment of the present invention, which is especially useful for the analysis of a known protein or a family of proteins that share a high degree of sequence homology with the known protein as in the case of genetically modified variants of a parent molecule, or closely related molecules with the same function, but from different organisms, (e.g., having at least 85%, 90%, 95%, and/or 98% sequence homology) a purified, isotope-labeled, calibrated form (analog) of a target protein is added to a solution (e.g., a cell extract) known or believed to contain the target protein. The resulting mixture is subjected in its entirety to rapid protein fragmentation, e.g., by trypsin digestion. The resulting peptides are briefly separated, e.g., by reverse-phase chromatography, and the eluting peptides are monitored by mass spectrometry. The ratio of integrated peak areas of a reconstructed ion current chromatogram of corresponding peptides (wildtype and isotope-labeled) provides a direct measure for the molar concentration of the unknown concentration of the known protein.

As detailed in Example 1, the inventors have tested such a method with $^{15}$N-*Bacillus lentus* subtilisin-N76D-S103A-V104I ($^{15}$N-subtilisin-DAI), and accurately determined the unknown concentrations of subtilisin-DAI to ±5%. In other experiments, correct concentrations were obtained with a standard-to-target mass ratio of up to 10:1, with as low as 2 $\mu g \cdot ml^{-1}$ and as little as 2 μg of target protein (see Table II). In yet another experiment, the fragmentation time was reduced to 1 min, and the total chromatography cycle was limited to 20 min (see FIG. 3).

The technique has been validated by using the same internal standard for a large number of variants with as many as ten different mutations, some of which affect the catalytic properties so that rate measurements could not serve as a convenient or reliable way of quantifying the proteins in crude solutions. With an extended chromatography regime, one can pinpoint the approximate area of mutation, and in some cases even the exact mutation. It should be appreciated that there is no limit to the sequence variation as long as at least one peptide is shared between the internal standard and the target protein. The application of the methods of the present invention to the quantitation of variants that have lost catalytic function is of particular interest. In one specific case, this technique was used to quantitate a putative alkaline serine protease in a commercially available, solid fermentation product, as detailed in Example 2.

Unknown Protein

The methods of the present invention can be applied to unknown (putative) polypeptides, as well. Analysis of such polypeptides can be accomplished, for example, using synthetic isotope-labeled peptides, or by calibrating an isotope-labeled cell extract with peptides of natural abundance atomic composition. In an embodiment of the latter, a putative protein of interest is selected using one or more available databases and software tools. A number of sequence libraries can be used, including, for example, the GenBank database (now centered at the National Center for Biotechnology Information, Bethesda, summarized by Burks et al., 1990), EMBL data library (now relocated to the European Bioinformatics Institute, Cambridge, UK, summarized by Kahn and Cameron, 1990), the Protein Sequence Database and PIR International (summarized by George et al., 1996), and SWISS-PROT (described in Bairoch and Apweiler, 2000). The ExPASy (Expert Protein Analysis System) proteomics server of the Swiss Institute of Bioinformatics (SIB), at http://www.expasy.ch/, provides information on, and URLs (links) for, numerous available databases and software tools for the analysis of protein sequences. Another listing of URLs to access tools for protein identification and databases on the Internet is set out by Lahm and Langen, 2000.

For example, in a case where it is desired to select a putative protein of a *Bacillus* species, one can search a database of

*Bacillus* sequence information, e.g., as described by Kunst et al., 1997, and available over the Internet at http://genolist.pasteur.fr/SubtiList/. It should be appreciated that the present invention is applicable to any sequence databases and analysis tools available to the skilled artisan, and is not limited to the examples described herein.

Once a putative protein has been selected, a theoretical fragmentation (e.g. trypsin digest) of the protein of interest is performed. Several programs to assist with protease digestion analysis are available over the Internet. MS-Digest, for example, (available at http://prospector.ucsf.edu/) allows for the "in silico" digestion of a protein sequence with a variety of proteolytic agents including trypsin, chymotrypsin, V8 protease, Lys-C, Arg-C, Asp-N, and CNBr. The program calculates the expected mass of fragments from these virtual digestions and allows the effects of protein modifications such as N-terminal acetylation, oxidation, and phosphorylation to be considered. From the theoretical-fragmentation, a suitable peptide is selected, which can then be synthesized and calibrated. The suitability of the peptide can be checked by querying the genome of interest for redundancy. If the same peptide (string of amino acid residues) occurs on more than one protein then another peptide should be selected.

Next, the organism can be grown on isotope-enriched media. In a preferred embodiment, the nitrogen content of the media is enriched in $^{15}N$. The calibrated peptide is added to a protein extract from the cells, and the entire mixture is digested rapidly and 'cleaned up'; for example, and without limitation, by precipitation, ultra-filtration, or ion exchange chromatography. The choice of an optimal technique can be tailored by the skilled artisan to the properties of the peptide (size, charge, hydrophic index, etc.) since these features can be established prior to the use of the peptide as an internal standard. The resulting 'lean' solution is passed over a RP-HPLC column attached to a mass spectrometer. Since the characteristics of the internal standard peptide (retention time, mass) are known, the skilled artisan can focus the separation and the mass measurement on a very narrow window, both in time and mass, and thereby tremendously increase the sensitivity of the detection. If the expected peak pair is found (wild-type from internal standard, $^{15}N$ from organism), peak area integration yields the absolute concentration of the targeted protein. Preferably, in this embodiment, a series of experiments is carried out, as appropriate, to assure that the fragmentation of the target protein is substantially complete with respect to the peptide of interest. The $^{15}N$-labeled extract can be queried for any number of proteins, even simultaneously, as long as mass and retention times can be properly spaced.

Advantageously, the just-described method provides a calibrated $^{15}N$-labeled protein mixture (cell extract) that can be conserved (e.g., in small aliquots) for later use. For example, now possessing a calibrated $^{15}N$-labeled cell extract, the organism can be grown under defined conditions, and extracts queried for the presence, for an increase or decrease of the absolute concentration of the target protein by mixing it with the calibrated $^{15}N$-labeled aliquot. It should be appreciated that, at this stage, the digest does not have to be quantitative as long as a little of the fragment of the molecule of interest is formed. Analysis can be carried out by LC/MS as above. The skilled artisan can increase the accuracy of absolute quantitation by searching for one or more other peptides from the target protein because they all must exist as pairs. A byproduct of this approach is that any protein other than the target proteins can be quantified relative to the level in the isotope-labeled sample similar to the approach taken by others using isotope labeling (Oda et al., 1999) and reporter groups (Gygi et al., 1999).

Additional General Embodiments/Examples

The teachings herein can be adapted to a number purposes. For example, the selected target can be a polymer of nucleotides, e.g., one or more polynucleotides and/or oligonucleotides. According to one general embodiment, a target oligonucleotide is selected for analysis and an analog of the target oligonucleotide is generated. The target oligonucleotide can be, for example, an oligonucleotide that is known to be in a mixture, a putative oligonucleotide (e.g., derived from a genome database search) that is potentially present in a mixture, or a known or putative oligonucleotide segment or fragment. The analog of the target oligonucleotide can be the target oligonucleotide itself or a unique segment or fragment of the target oligonucleotide. One or the other of the target oligonucleotide and analog is labeled, using methods known in the art (e.g., $^{32}P$ labeling), so that the two can be distinguished from one another in subsequent mass analysis. The analog is purified and its absolute quantity is determined in a solid quantity or in a solution by standard techniques (the analog is now said to be 'calibrated'), and a known amount is employed as an internal standard in the solution to be assayed. The oligonucleotides of the mixture are treated with a fragmenting activity (e.g., an endonuclease), and the oligonucleotide fragments of the mixture are then resolved. Corresponding oligonucleotide fragment pairs are then analyzed by selected ion monitoring of a mass spectrometer. Peak area integration of such pairs provides a direct measure for the amount of target oligonucleotide in the crude solution.

The present teachings can be adapted for the identification of a target biopolymer fragment in a crude solution or mixture. In one embodiment, wherein a fragment of a target protein is identified in a solution otherwise not including such fragment (i.e., the fragment to be identified is not natively present in the solution), a selected fixed ratio of an analog of the target protein and the target protein are added to the solution. The target protein and analog are then subjected to fragmentation, e.g., by treatment with a fragmenting activity, thereby generating a plurality of corresponding peptide pairs. The peptide fragments are then resolved, e.g., by way of a suitable chromatographic technique. Mass spectrometric analysis is then employed to identify those fragment pairs corresponding to the target protein that exhibit the selected ratio. In other words, the fragments that arose from the target protein are identified via their characteristic (selected) mass ratio. Next, the fragment pairs exhibiting the selected ratio can then be sequenced using any suitable technique, e.g., utilizing further mass spectrometric analysis, database query, etc. (see, e.g., Lahm and Langen, 2000; Corthals et al., 1999).

The following preparations and examples are given to enable those skilled in the art to more clearly understand and practice the present invention. They should not be considered as limiting the scope and/or spirit of the invention, but merely as being illustrative and representative thereof.

In the experimental disclosure which follows, the following abbreviations apply: eq (equivalents); M (Molar); μM (micromolar); N (Normal); mol (moles); mmol (millimoles); μmol (micromoles); nmol (nanomoles); g (grams); mg (milligrams); kg (kilograms); μg (micrograms); L (liters); ml (milliliters); μl (microleters); cm (centimeters); mm (millimeters); μm (micrometers); nm (nanometers); ° C. (degrees Centigrade); h (hours); min (minutes); sec (seconds); msec (milliseconds); Ci (Curies) mCi (milliCuries); μCi (microCuries); TLC (thin layer chromatography).

EXAMPLES

The following examples are illustrative and are not intended to limit the invention.

Example 1

1A. Materials and Methods

*Bacillus lentus* subtilisin-N76D-S103A-V104I (subtilisin DAI) was expressed by *Bacillus subtilis* grown on minimal media and $^{15}$N-urea as nitrogen source. The protein was purified (Goddette et al., 1992; Christianson and Paech, 1994) and calibrated by amino acid analysis and by active site titration (Hsia et al., 1996) as described previously. Once calibrated, succinyl-L-alanyl-L-alanyl-L-prolyl-L-phenylalanyl-p-nitroanilide (sucAAPF-pNA) supported catalytic activity in 0.1 M Tris/HCl, containing 0.005% (v/v) Tween 80, pH 8.6 at 25° C., recorded at 410 nm and measured in AU·min$^{-1}$, was used to quantify the enzyme concentration (f=0.020 mg·min·AU$^{-1}$). Wildtype *Bacillus lentus* subtillsin (subtillsin) was purified, calibrated, and measured similarly (f=0.053 mg·min·AU$^{-1}$).

Standard peptide mapping with trypsin was carried out as outlined by Christianson and Paech, 1994, except that sample sizes ranged from 2 to 100 µg of protein. Peptides were separated by HPLC (Hewlett-Packard model 1090) on a $C_{18}$ reverse-phase column (Vydac, 2.1×150 mm), heated to 50° C., using a gradient of 0.08% (v/v) trifluoroacetic acid (TFA) in acetonitrile and 0.1% (v/v) TFA in water. The column eluate was monitored by UV absorbance at 215 nm and by mass measurement on an ESI mass spectrometer (Hewlett-Packard, model 5989B/59987B).

Rapid peptide mapping was performed with a trypsin-to-protein ratio of 1:1 for 15 s to 1 min at 37° C. Peptides were separated on 2.0×50 mm $C_{18}$ reverse-phase column (Jupiter, by Phenomenex).

1B. Results

FIG. 1: UV traces of a tryptic co-digest of $^{15}$N-subtilisin DAI and subtilisin, Peptides are numerated in the order of occurrence beginning with the N-terminus (see Table I).

Figure 2A:
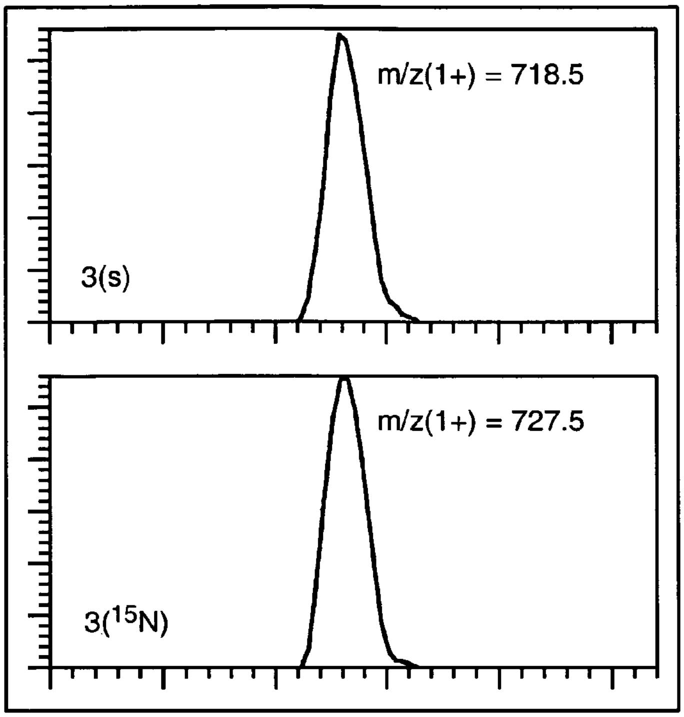
FIG. 2. Total ion current chromatogram of selected peptides in FIG. 1. (A) Peptide 3 of subtilisin (3 (s), upper panel) and peptide 3 of $^{15}$N-subtilisin-DAI (3 ($^{15}$N), lower panel). (B) TIC of peptides 5, 6, and 9 of the co-digest of $^{15}$N-subtilisin-DAI, indexed ($^{15}$N), and subtilisin, indexed (s). Sequence differences between subtilisin-DAI and subtilisin reside on peptide 5 (N74D) and 6 (S101A, V102I). Amino acid sequence numbering is linear.
Figure 2B:
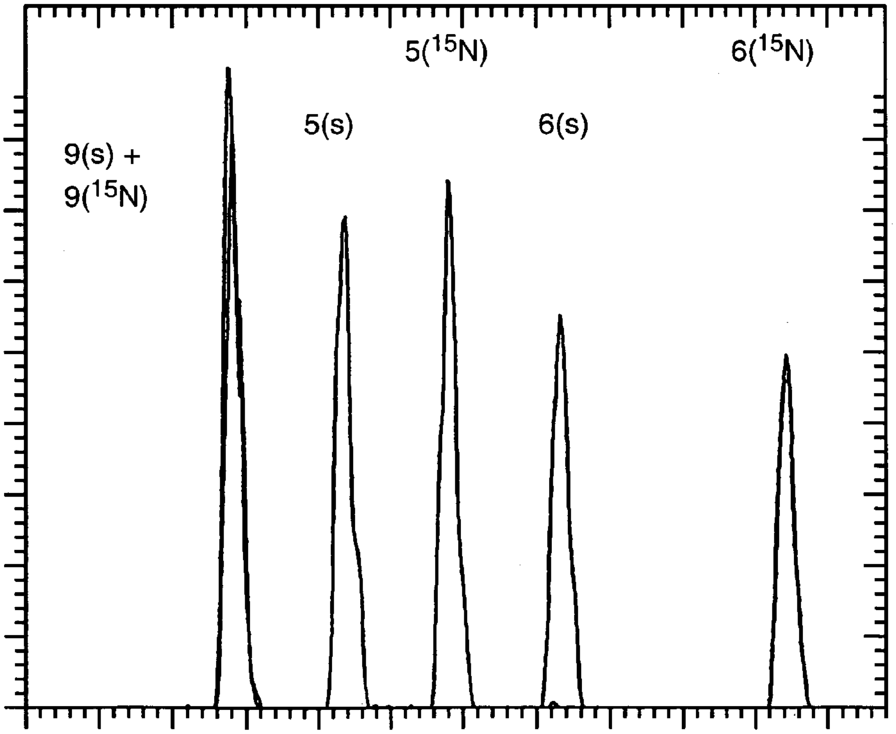

FIG. 2. (A) Integrated total ion current (TIC) chromatogram of peptide 3 of subtilisin (indexed (s)) and $^{15}$N-subtilisin DAI (indexed ($^{15}$N). (B) TIC of peptides 5, 6 and 9 of $^{15}$N-subtilisin DAI and subtilisin. The results of area integration for both TIC and UV peaks are summarized in Table I. Note that sequence differences of subtilisin and subtilisin-DAI reside on peptide 5 (N74D) and 6 (S101I, V102A). Amino acid sequence numbering is linear.

Table I: Sequence comparison, m/z values, and ratios of integrated TIC peak areas and UV absorbance peak areas for chromatograms in FIG. 1. The concentration measured by the co-digest technique for subtilisin and subtilisin-DAI was 8.15 and 7.13 mg/ml, respectively, while the given concentration (established by independent methods) was 7.99 and 7.03mg/ml, respectively. The sequences shown are: AQSVPWGISR (SEQ ID NO:4), VQAPAAHNR (SEQ ID NO:5), GLTGSGVK (SEQ ID NO:6), VAVLDTGISTHPDLNIR (SEQ ID NO:7), GGASFVPGEPSTQDGNGHGTHVAGTIAALDNSIGVLGVAPSAELYAVK (SEQ ID NO:8), VLGASGSGAISSIAQGLEWAGNNGMHVANLSLGSPSPSATLEQAVNSATSR (SEQ ID NO:9), GVLVVAASGNSGAGSISYPAR (SEQ ID NO:10), YANAMAVGATDQNNNR (SEQ ID NO:11), ASFSQYGAGLDIVAPGVNVQSTYPGSTYASLNGTSMATPHVAAAAWLVK (SEQ ID NO:12), QKNPSWSNVQIR (SEQ ID NO:13), NHLK (SEQ ID NO:14), and NTATSLGSTNLYGSGLVNAEAATR (SEQ ID NO:15).

Example 2

Figure 5:
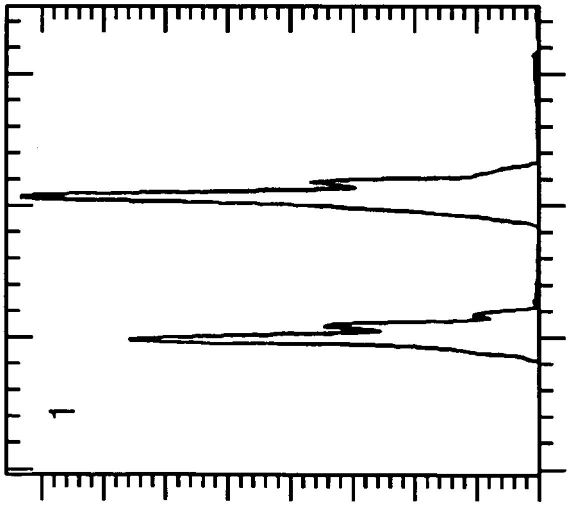
FIG. 5. Total ion current chromatogram of peptides 1, 2, and 3 from FIG. 3. (1) Mass 980.6 (1+), left trace; mass 991.5 (1+), right trace, corresponding to tryptic peptide SSLENTTTK (SEQ ID NO:1) of BPN' and containing 1 nitrogen atoms. (2) Mass 765.6(2+), left trace; mass 775.6 (2+), right trace corresponding to tryptic peptide APALHSQGYTGSNVK (SEQ ID NO:2) of BPN' and containing 20 nitrogen atoms. ‘x’ is an unrelated peptide. (3) Mass 627.0 (2+), left trace; mass 636.4(2+), right trace corresponding to tryptic peptide HPNWTNTQVR (SEQ ID NO:3) of BPN' and containing 19 nitrogen atoms.
Figure 5:
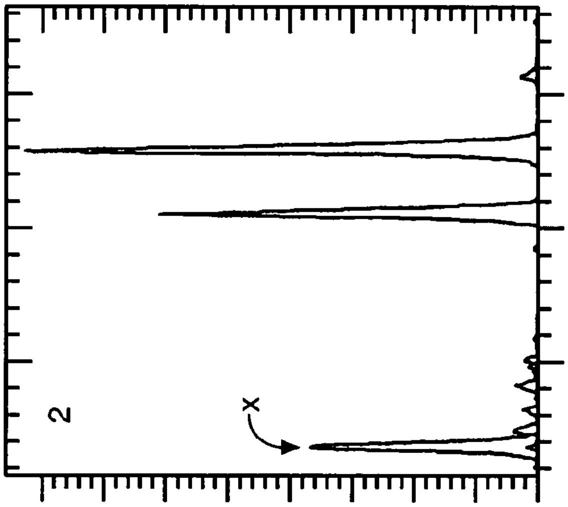
Figure 5:
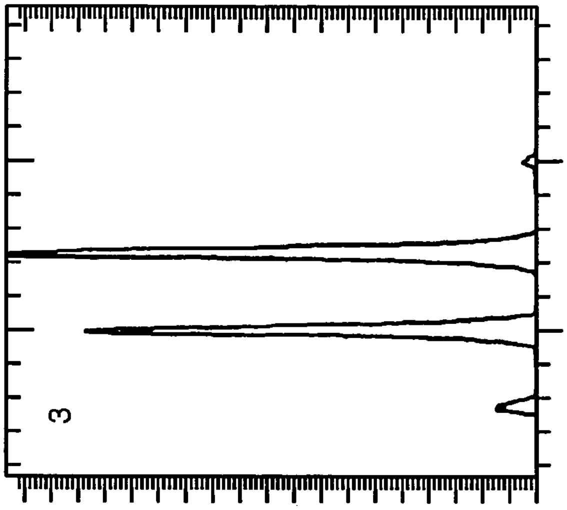

A fermentation broth concentrate of unknown origin was suspected of containing an alkaline serine protease. A small sample was dissolved in buffer and spiked with purified $^{15}$N-labeled subtilisin-Y217L. The mixture was digested with trypsin, peptides were separated by RP-HPLC, and the eluate monitored by UV absorbance and by mass spectrometry. FIG. 4 (A) shows an SDS-PAGE gel of the composition of the sample. FIG. 4 (B) displays the peptide map, and FIG. 5 gives a few examples of TIC traces. The data show that the sample contains an alkaline serine protease closely related to subtilisin BPN', and in this case, specifically at 0.54 mg·ml$^{-1}$.

Example 3

Randomly generated variants of subtilisin-DAI were expressed by cultures grown on minimal media in microliter plates. Aliquots of cell-free supernatants were probed for the presence of subtilisin-DAI variants by co-digests with $^{15}$N-labeled subtilisin-DAI. In separate experiments the catalytic activity was measured. In yet another experiment, the ratio of specific concentration to activity (referred to as ‘conversion factor’ f) was measured by active site titration with a mung bean inhibitor (MBI) solution calibrated in the same experiment with a previously standardized solution of subtilisin-DAI (Hsia et al., 1996). The data shown in Table II show convincingly the accuracy of the peptide mapping method for protein concentration measurements. A further advantage of the technique is that the protein variants can be queried for similarities and approximate location of mutations. Because all peptides of the internal standard are known, each can be checked for the presence of the unlabeled counterpart. If not present the target protein has a mutation on that sequence. Next one would search for a peptide of closely related mass and verify that it exists in the quantity, anticipated from the quantity of those peptides identical in sequence with the internal standard, using the UV trace.

Example 4

From the previous example one can extrapolate that the method should work with equal efficiency and accuracy for proteins of unknown properties but known sequence by using instead of purified $^{15}$N-labeled protein a synthetic $^{15}$N-labeled peptide. This will be added to the sample ready for trypsin digestion. After digestion the sample will be analyzed as before.

Example 5

$^{15}$N Protease

This example describes a method for the batch preparation of a $^{15}$N-labeled protease. The Mops/Urea shake flask protocol (described above) was used with all of the chemicals, except for the urea, purchased from Sigma chemical in highest purity available. $^{15}N_2$ Urea (99 atom %) was purchased from Isotec, Inc. A 1.8 L batch of media was prepared with chloramphenicol at 25 ppm and sterile filtered. 300 mL was added aseptically to each of the 6 sterilized 2.8 L bottom baffled fembachs. The inoculation was done by adding the thawed and mixed glycerol stocks, protease hyper producer prepared previously in the Mops/urea media and frozen, at 1 vial (1.5 mL) per shake flask. The shake flasks were put into a New Brunswick shaker/incubator, after inoculation, and run at 37° C. and 350 rpm for 78 hours. At the harvest point, 78 hours, AAPF activity assays were done on the samples and titers ranged from 0.7 g/L to 1.4 g/L. The contents from the shake flasks were pooled together, pH adjusted to 5.5 with acetic acid and centrifuged in 250 mL bottles at 12,000 rpm for 30 minutes. The supernatants were-filtered with a 0.8 micron Nalgene 1 L filter unit. The pool was assayed at 1.1 g/L for 1700 mL with the total $^{15}N$ protease being 1.9 gms. The supernatant was concentrated in the cold room (@4° C.) to 135 mL, using 3 Amicon 8400 stirred cells and PM10 (10,000 MWCO) membranes. There was no loss of protein in the concentration step.

Dialysis was done using 20 mM MES, pH 5.4, 1 mM $CaCl_2$ buffer in a 15 L graduated cylinder on a stir plate in the cold room, with the sample being added in two 67.5 mL aliquots respectively to 10,000 MWCO Spectra Por 7 dialysis tubing, clamped off and placed into the cylinder with buffer. After the overnight dialysis the samples were removed from the graduated cylinder, the clamps removed from the dialysis tubing and the contents poured into and filtered using a 0.45 micron Nalgene 500 mL filter unit. Assays run at this time showed no loss of protein at 1.9 gm total available in 250 mL.

The protease protein was purified using a low pH buffer system with a cation exchange column because the PI of the enzyme is around 8.6. An Applied Biosystems Vision was used to do the purification along with a 16×150 mm (32 mL) column of POROS HS 20 (Applied Biosystems cation exchange resin). The program used to do the purification is as follows: Equilibrate the column at 50 mL/minute with 20 cv's (colume volumes) of 20 mM MES, pH 5.4, 1 mM $CaCl_2$ buffer, load the sample (150 mL) onto the column at 15 mL/minute, wash the column at 50 mL/minute with a gradient from the 20 mM MES, pH 5.4, 1 mM $CaCl_2$ buffer to 20 mM MES, pH 6.2, 1 mM $CaCl_2$ buffer in 25 cv's. Elute the $^{15}N$ protease protein with a gradient from 20 mM MES, pH 6.2, 1 mM $CaCl_2$ buffer to 20 mM MES, pH 6.2, 1 mM $CaCl_2$, 15 mM NaCl buffer in 75 cv's (start collecting the fractions at 5 cv's into the gradient). Finally, clean the column off with a salt wash of 2M NaCl 10 cv's, rinse with 10 cv's of $H_2O$. This run was made three times to purify all of the labeled protein, the $^{15}N$ protease came off the column between 8 to 12mM NaCl, with 95 11 mL fractions collected each run. The labeled protease was concentrated from 1.8 L to 150 mL using an Amicon stirred cell with a 10,000 MWCO PM membrane, with a buffer exchange/diafiltration to 20 mM MES, pH 5.4, 1 mM CaCl2 to prepare the sample for another run on the same system with the same method. Some of the labeled protease was lost because of the cuts made on the fractions collected, with the total available $^{15}N$ protease down to 1.4 gm. After three more runs the purification was done. There was a pool of purified material with a 1.3 L total volume. This was concentrated down to 65 mL using the Amicon concentrator and a buffer exchange to 20 mM MES, pH 5.4, 1 mM $CaCl_2$ buffer. The $^{15}N$ protease purified sample was sterile filtered through a 0.22 micron using the Nalgene 0.22 micron 250 mL filter unit. An AAPF activity assay showed the concentration to be 20 g/L (mg/mL) and this was aliquoted into 60 Nalgene 1.8 mL cryovials at 1 mL of sample each (the identity, date and concentration was labeled onto each vial). These vials were frozen at −20° C. in a labeled container.

Analysis was done on these samples to confirm the concentration, the purity and the presence of the $^{15}N$ labeling. An SDS-PAGE gel run against an unlabelled protease standard showed no molecular weight bands greater than 27,480, the intensity of the protease bands at 27,480 Daltons was about the same with the subsequent breakdown bands (3) to be of the same intensity also. An amino acid analysis showed that the AAPF activity concentration to be the same (20 g/L) as well as the BCA total protein concentration run against the unlabelled protease standard. Tryptic digests/codigests with protease (unlabelled) and subsequent peptide mapping with MS analysis on the HP 59987A engine showed that the peptides were labeled with $^{15}N$. Thus, the material was shown to be what was intended, $^{15}N$ labeled protease, suitable for analytical use.

Those skilled in the art will appreciate the numerous advantages offered by the present invention. For example, unlike the prior methods, the methods taught herein can yield absolute protein concentrations. In comparison, ICAT (Gygi et al., 1999) measures relative quantities, as does staining of 2D gels or the isotope technique by Oda et al., 1999. A further advantage of the present method is that it applies to all proteins, while the ICAT technology can capture only about 10% of all proteins since it relies on the presence of free SH groups. Yet a further advantage of the present invention is that this methodology is compatible with all automated equipment developed for protein identification under the 'proteomics' umbrella.

The present invention is useful where only very dilute concentrations of biopolymer are available for analysis. With regard to quantity, for example, the present invention can be employed to determine the absolute quantity of a selected protein in a solution containing less than 25, less than 20, less than 15, less than 10, less than 5, and down to about 2 micrograms, or less, of such protein. With regard to concentration, the present invention can be employed to determine the absolute quantity of a selected protein in a solution containing less than 25, less than 20, less than 15, less than 10, less than 5, and down to about 2 micrograms/ml, or less, of such protein.

Various other examples and modifications of the foregoing description and examples will be apparent to a person skilled in the art after reading the disclosure without departing from the spirit and scope of the invention, and it is intended that all such examples or modifications be included within the scope of the appended claims. All publications and patents referenced herein are hereby incorporated by reference in their entirety.

It is claimed:

1. A method for determining the absolute quantity of a target biopolymer in a crude solution, comprising the steps of:

(a) adding a known quantity of a calibrated analog of said target biopolymer to said crude solution, wherein said analog is the target polypeptide, a unique segment or a fragment thereof, and wherein one of said analog and said target biopolymer is isotope labeled;

(b) treating the target biopolymer and analog with a fragmenting activity to generate a plurality of corresponding biopolymer and analog fragment pairs in said crude solution;

(c) fractionating the crude solution produced in step (b) by a chromatopraphic technique to resolve said plurality of fragment pairs produced in step (b);

(d) determining by mass spectrometric analysis of a fraction in step (c) the ratio of a selected target biopolymer to its corresponding analog; and (e) calculating, from said ratio and said known quantity of said analog, the absolute quantity of the target biopolymer in the mixture.

2. The method of claim 1, wherein the biopolymer is a polypeptide.

3. The method of claim 1, wherein the biopolymer is a polynucleotide.

4. The method of claim 1, wherein the solution is a crude fermenter solution, a cell-free culture fluid, a cell extract, or a mixture comprising the entire complement of proteins in a cell or tissue.

5. The method of claim 1, wherein said isotope is a stable isotope selected from the group consisting of $^{18}O$, $^{15}N$, $^{13}C$, and $^{2}H$.

6. The method of claim 5, wherein one of said target biopolymer and said analog is enriched in $^{15}N$, and the other contains a natural abundance of N isotopes.

7. The method of claim 6, wherein said target biopolymer or said analog is produced synthetically using $^{15}N$-enriched precursor molecules.

8. The method of claim 6, wherein the target biopolymer or analog enriched in $^{15}N$ is produced by a microorganism grown on $^{15}N$-enriched media.

9. The method of claim 2, wherein said step of fragmenting is carried out by treating said solution containing said target polypeptide and said analog with a proteolytic enzyme.

10. The method of claim 9, wherein said proteolytic enzyme comprises trypsin.

11. The method of claim 1, wherein said step of resolving is effected by a chromatographic technique.

12. The method of claim 11, wherein said chromatographic technique is HPLC or reverse-phase chromatography.

13. The method of claim 1, wherein the target biopolymer is selected from the group consisting of enzymes, antibodies, receptors, hormones, growth factors, antigens, and ligands.

14. The method of claim 3, wherein said target polynucleotide is an oligonucleotide.

15. The method of claim 3, wherein said fragmenting step is carried out by treating said solution containing said target polynucleotide and said analog with a restriction enzyme.

16. The method of claim 15, wherein said restriction enzyme is a Type II restriction enzyme.

* * * * *

UNITED STATES PATENT AND TRADEMARK OFFICE

CERTIFICATE OF CORRECTION

PATENT NO. : 7,396,688 B2
APPLICATION NO. : 11/011666
DATED : July 8, 2008
INVENTOR(S) : David A. Estell et al.

It is certified that error appears in the above-identified patent and that said Letters Patent is hereby corrected as shown below:

In Column 29, Claim 1

On line 25, please replace “chromatopraphic” with --chromatographic--.

Signed and Sealed this

Eighteenth Day of November, 2008

JON W. DUDAS

*Director of the United States Patent and Trademark Office*